July 15, 1952   H. E. BRYAN   2,603,776
RADIO BEACON FOR INDICATING BEARING ON VEHICLES
Filed July 1, 1946   2 SHEETS—SHEET 1
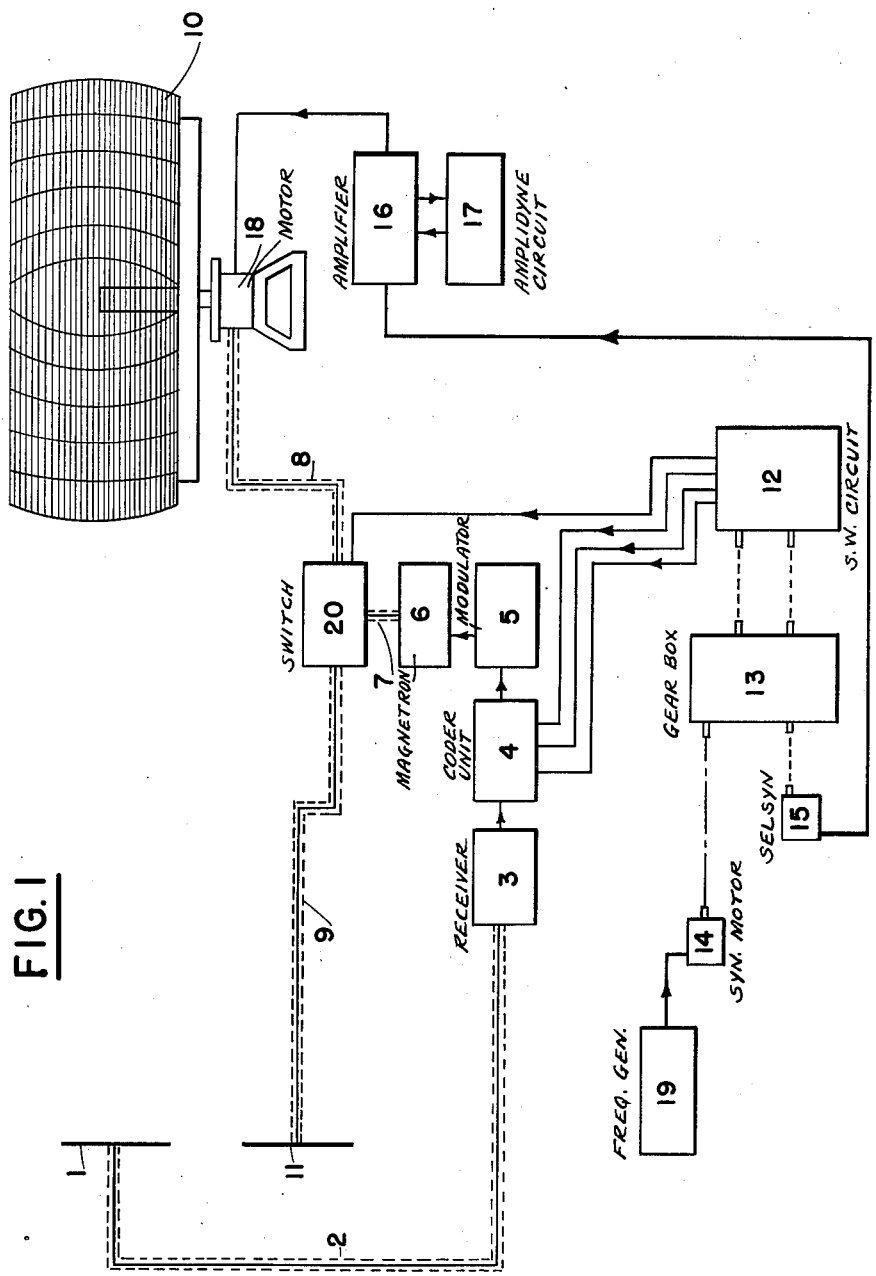
INVENTOR.
HAROLD E. BRYAN
BY 
ATTORNEY Patented July 15, 1952

2,603,776

UNITED STATES PATENT OFFICE 2,603,776

RADIO BEACON FOR INDICATING BEARING ON VEHICLES

Harold E. Bryan, La Jolla, Calif.

Application July 1, 1946, Serial No. 680,785

11 Claims. (Cl. 343—6)

(Granted under the act of March 3, 1883, as amended April 30, 1928; 370 O. G. 757)

This invention relates to radio and radar navigational equipment, and has particular relation to devices of the type known as radar beacons.

In previous devices of this type, the accuracy of the bearing information is dependent on the beam width of the antenna on the ship or other mobile device carrying the interrogating equipment, since the bearings are taken by receiving the replies from a beacon by a directional antenna which was also used to transmit the challenging pulse, and the direction in which the antenna is pointed is reproduced as a direction or position of a radial sweep on a plan position indicator, thus showing the bearing of the beacon from the vessel. No indication is thus directly produced as to the bearing with respect to true north, and this information must be obtained from the heading of the ship.

In the system to be herein described, certain innovations and improvements in organization eliminate or greatly reduce these disadvantages.

It is therefore an object of my invention to provide a system for radar navigation particularly adaptable to harbor control or other involved small-area navigation, in which the bearings are taken by the beacon antenna located at a known point on the shore, and transmitted by means of synchronization of the antenna driving motor at the beacon and individual motors controlling the rate of rotation of the indicator sweep on the vessels being guided.

It is a further object to provide such a system in which such synchronization is maintained without the transmission of synchronizing pulses, such a system including the use of secondary frequency standards for driving synchronous motors on each of the guided vessels.

It is a feature of the invention to use at the beacon two transmitting antennas one of which is a parabolic reflector type, and the other an omni-directional vertical type.

A further feature is the transmission by the beacon of a north-marking pulse at the time when the rotating beacon antenna passes the north position.

Still another feature is the tansmission of this north marking pulse on the aforementioned omnidirectional antenna, so that it is transmitted in all directions at the time when the rotating antenna passes the north position.

Still another feature is the use of an omnidirectional receiving antenna at the beacon for receiving the interrogating pulses from the vessels being guided.

A further feature is the use on each vessel of an omnidirectional antenna used both for transmitting the interrogation and receiving the replies thereto.

Further features and advantages not specifically enumerated will be apparent by reference to the following detail descriptions taken in conjunction with the drawings.

In the drawings:

Fig. 1 is a block diagram of the invention, showing a typical system embodying the features which constitute my invention.

Figure 2:
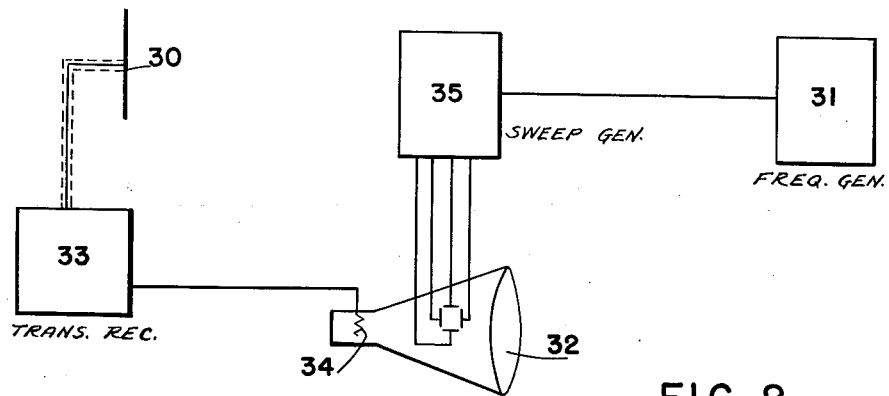
Fig. 2 is a drawing showing the equipment which is carried on each vessel to be guided by the beacon.

Referring now to Fig. 1, there is shown the block diagram of a complete installation according to my invention of a shore beacon establishment. The omnidirectional receiving antenna 1 is receptive to the interrogating pulses sent out by the vessel to be guided, and relays them through a coaxial cable 2 to a beacon receiver 3. Therein the signal is detected, amplified and applied to a coder unit 4 which produces as a result of the received trigger pulse, a series of pulses which are so spaced that they produce a pattern on the indicator tube at the receiver which is peculiar to the particular beacon being triggered. The series of pulses developed by the coder 4 is applied to a modulator unit 5 which controls the spacing and length of the pulses transmitted by a magnetron 6, the output of which is coupled to a coaxial transmission line 7. This transmission line is connected to a switching device 20, which is described in my co-pending application, Serial No. 626,869, now Patent 2,510,064.

The effect of this device is to switch the output from transmission line 7 to either of two antennas. This switching action is performed in accordance with a certain cycle of operation so that the omnidirectional antenna 11 is in use during the time that the north marker pulses are being transmitted, and the directional antenna 10 is in use when replies to interrogations are being transmitted.

This is performed by transferring the output from line 7 alternately to line 8 or line 9. Line 8 transfers the power from the transmitter to the rotating directional antenna 10, while the line 9 transfers the power from the transmitter to the omnidirectional north-marker antenna 11. This switching action is controlled by switching circuit 12 which is associated with the gear box 13.

This assembly is to be described in connection with Fig. 3. For the present, it is sufficient to mention that its effect is to cause the switch to be thrown to the directional antenna for approximately 8¾ revolutions of the antenna or 49½ seconds at 10 R. P. M., which is an appropriate antenna speed. At the end of this period at 8¾ revolutions, the transmitter is switched over to the omnidirectional antenna and the north marker pulses are transmitted therefrom at the appropriate time during this period.

The speed of rotation of the antenna, 10 and the switching rate of the mechanism 12 are set by the rate of rotation of a synchronous motor 14 which drives the gear box 13 and therefrom the antenna control selsyn 15. This antenna control selsyn is part of an amplidyne system comprising control amplifier 16 and amplidyne circuit 17 which control the speed and position of the motor 18 driving the rotating antenna 10.

The rate of rotation of this synchronous motor 14 is controlled by the frequency of a standard frequency generator 19 capable of maintaining its output frequency constant within 0.001%. Such a standard is presently available commercially.

Referring now to Fig. 2, there is shown the equipment needed on board the guided vessel. This equipment includes an omnidirectional antenna 30, a frequency standard 31 similar to 19, a cathode ray indicator system 32, including a radial sweep generated by generator 35 whose speed of rotation is controlled by standard 31, and transmitter-receiver 33 for transmitting interrogating pulses and receiving the returned replies from the beacon transmitter. The received signals as delivered at the output of the receiver 33 are applied to the grid 34 of the cathode ray indicator tube in such a manner as to modulate the beam of the cathode ray tube in said indicator, thus producing on said cathode ray tube a reproduction of the pulses delivered by the beacon transmitter, and the coding information applied thereto. Since the transmitting antenna 10 is directional, signals will be received by receiver 33 only when the antenna of the beacon is pointing at the vessel. Since the sweep of the cathode ray indicator 32 is caused to rotate at the same speed as the beacon transmitting antenna 10, the pulses from the beacon will appear at the same angular position on the face of the cathode ray indicator on each successive rotation, except as modified by motion of the vessel.

When, at the end of 8¾ rotations of the beacon antenna 10, the output of the beacon transmitter is switched to the omnidirectional antenna 11 pulses are transmitted when the antenna 10 passes the north direction. These pulses are differently coded from the bearing pulses, so that a distinctive pattern appears on the indicator of the vessel at the angular position which corresponds to a bearing from the beacon of true north. The indicator 32 is fitted with a rotatable cursor which is manually adjustable so that the north bearing can be shifted to correspond with the north marker pulses transmitted from the beacon, as they are presented on the indicator 32. Thus all bearings are referred to true north as determined at the shore beacon installation. It is of course possible to so arrange the equipment at the shore station that the bearings transmitted are the bearings of the beacon with respect to the ship rather than the bearings of the ship with respect to the beacon. In many cases this may be the preferred embodiment.

Figure 3:
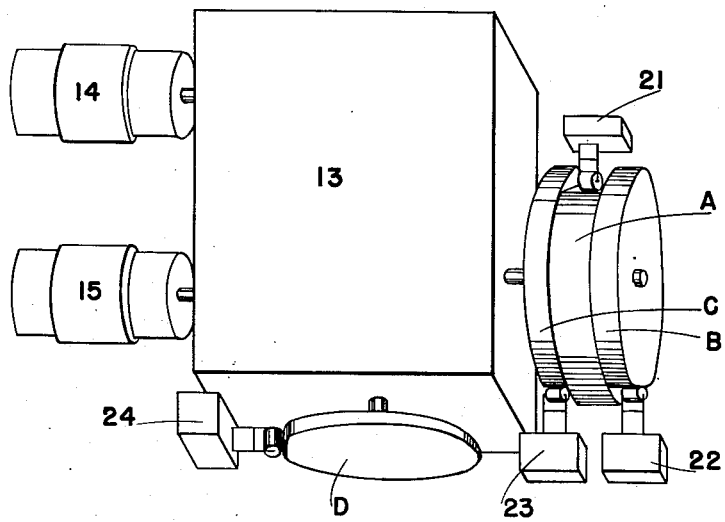
Fig. 3 shows the mechanism used for timing the pulses emitted from the beacon to produce the pattern hereinafter described.

Fig. 3 shows a more detailed view of the antenna control and code switching mechanisms in the beacon installation. There is shown the synchronous motor 14, which drives a gear train 13, from which are driven four cams A, B, C, and D. These cams control respectively microswitches 21, 22, 23, and 24. Cams A, B, and C rotate at 1 R. P. M. in the embodiment chosen for illustration, while cam D rotates at 10 R. P. M.

Switch 21 is used to short circuit the output of the beacon bearing coder 4 during the north marking pulse period of 1¼ revolutions of the directional antenna, and is closed for this period.

Switch 22 is used to close the circuits for producing the code which identifies the north marker pulses.

Switch 23 is used to operate the switch which changes from the directional antenna to the omnidirectional antenna for the north marking pulse period.

Switch 24 is used to remove the short on the coder output for approximately 2° of each rotation of the antenna, thus allowing the code as modified by the circuits controlled by switch 22 to be applied to the modulator circuit.

Reviewing the operation of the system as a whole:

On the ship to be guided, an interrogating transmitter contained in the transmitter-receiver unit 33 sends out challenging pulses by means of a non-directional antenna, which are subsequently received at a shore located beacon station by a second non-directional antenna 1, and conducted therefrom by means of a transmission line 2 which is shown as a coaxial line, but which may also be either a waveguide or other approved type of transmission means, to a beacon receiver 3, in which the pulses of radio frequency energy from the interrogating transmitter are detected, amplified, and applied to a coder unit 4, which develops a series of pulses definitely related in time to the triggering pulse, but spaced for identification of the beacon station. The pulses developed by this coder unit are applied to the modulator 5, which controls the length and spacing of the pulses emitted by a magnetron transmitter 6, the output of which is coupled to a transmission line 7. This transmission line is connected to a switching device 20, which determines which of two types of antennas are to be used with the system, either a rotary directional antenna 10, or an omnidirectional antenna 11. The switch which performs this action is remotely controlled by a cam switch 23, which is in turn operated by cam C which is in turn operated by a connection to a gear box 13, which is driven by a synchronous motor 14, whose speed is controlled by the frequency of a secondary frequency standard 19.

Returning to the ship which is to be guided, the pulses sent out by the beacon are received by an omnidirectional antenna 30, when the beacon antenna is directed toward the ship only, and therefrom conducted to the receiver portion of transmitter-receiver 33, therein amplified and detected, and applied to a cathode ray tube 32 for modulation of the intensity of the beam thereof.

To the said cathode ray tube is also applied suitable deflection voltages for the production of a radial sweep thereon, and means for rotating said sweep at a rate fixed by the mechanical rate of rotation of a selsyn driven by a synchronous motor whose speed is fixed by the frequency of a secondary standard 31. The speed of rotation of the sweep on the indicator 32 is the same as the speed of rotation of the antenna 10 at the beacon, within the limits of accuracy of the frequency standards 19 and 31.

Since the reply pulses transmitted from the beacon will only be received when the beacon antenna 10 is directed towards the ship, the indicator 32 will show a target or response only at one angular position on its face.

During approximately two rotations of each ten rotations of the antenna 10, the output of the beacon transmitter is diverted from the antenna 10 and applied to the omnidirectional antenna 11. In this period, no pulses are transmitted except during the time when the antenna is passing through true north.

During these rotations, switches 21, 22 and 24 act to produce a new and distinctive code which serves to identify these north marking pulses from other responses. These pulses will then appear on the indicator 32 at an angular position which corresponds to a bearing from the beacon of true north. An adjustable cursor or azimuth scale is provided on the indicator 32 which is adjusted to agree with the north marker.

It is to be understood, of course, that the system as described herein, is a specific example of a system embodying the principles of my invention, and that the structure may be considerably varied without departing from the spirit of the invention.

As an example, such a system could be adapted for airport traffic control, being arranged to show the bearing of an aircraft relative to a central beacon station at an airport.

The invention described herein may be manufactured and used by or for the Government of the United States of America for governmental purposes without the payment of any royalties thereon or therefor.

I claim:

1. A system for navigation by means of a pulse type radio beacon transmitter capable of being triggered by an interrogating pulse, wherein there are supplied in conjunction with said transmitter a rotating directional transmitting antenna and an omnidirectional transmitting antenna, means for alternately connecting said antennas to said beacon transmitter, means for controlling the pulse duration and spacing of the generated pulses, including means for spacing said pulses according to a prearranged pattern peculiar to the particular transmitter involved and producing such a train of pulses for each interrogating pulse, means for receiving said interrogating pulses, including an omnidirectional antenna, means for producing and radiating said interrogating pulses on a vehicle, means on said vehicle for receiving the coded pulses transmitted by the beacon transmitter, means for producing on a cathode ray tube a rotating radial sweep, means for causing said sweep to rotate at the same speed as the rotating antenna at the beacon station, means for indicating on said tube the time at which said rotating antenna is directed in a predetermined geographic direction, and means for modulating the beam intensity of said tube in accordance with the received pulses, whereby there is presented thereon a representation of the bearing of the vehicle relative to the beacon station.

2. A system for navigation comprising a triggerable radio frequency beacon transmitter equipped with a rotating directional antenna and an omnidirectional antenna, means for selectively connecting said beacon transmitter from the directional antenna to said omnidirectional antenna, means for transferring bearing information between said directional antenna and a vehicle upon transmission of an interrogating pulse from said vehicle, said means including synchronous motors driven by voltages generated by frequency generators, means for transmitting from said omnidirectional antenna a distinctive response at the time when said directional antenna passes the true north direction, means for reproducing at said vehicle on a cathode ray tube a rotating radial sweep, the rotation of said sweep being in synchronism with one of said synchronous motors, said rotating antenna being in synchronism with the other of said motors, means for reproducing on said cathode ray tube the aforementioned north marking pulse, whereby the direction of said vehicle from said beacon is thereon represented.

3. A system for navigation comprising a triggerable radio frequency beacon transmitter equipped with a rotating directional antenna and an omnidirectional antenna, means for selectively connecting said beacon transmitter from the directional antenna to said omnidirectional antenna, means for transferring bearing information between said directional antenna and a vehicle upon transmission of an interrogating pulse from said vehicle, said means including synchronous motors driven by voltages generated by frequency generators, means for transmitting from said omnidirectional antenna a distinctive response at the time when said directional antenna passes the true north direction, means for producing at said vehicle on a cathode ray tube a rotating radial sweep, the rotation of said sweep being in synchronism with one of said synchronous motors, said rotating antenna being in synchronism with the other said motor, and means for reproducing on said cathode ray tube said north marking pulses, whereby the direction of said vehicle from said beacon is thereon represented.

4. A system for navigation comprising a triggerable radio frequency beacon transmitter equipped with a rotating directional antenna, means for transferring bearing information between said directional antenna and a vehicle, said means including synchronous motors driven by voltages generated by frequency generators, means for transmitting from said beacon a distinctive response at the time when said directional antenna passes the true north direction, including an omnidirectional antenna for radiating said responses and means for switching the output of the beacon transmitter from the directional antenna to said omnidirectional antenna by switching means controlled by cam operated switches, in turn driven by the antenna controlling synchronous motor, means for reproducing at said vehicle on a cathode ray tube a rotating radial sweep, the rotation of said sweep being in synchronism with one of said synchronous motors, said rotating antenna being in synchronism with the other of said motors, and means for reproducing on said cathode ray tube the aforementioned north marking pulse, whereby the direction of said vehicle from said beacon is thereon graphically represented.

5. A system for navigation by means of a pulse type radio beacon transmitter capable of being triggered by an interrogating pulse, wherein there are supplied in conjunction with said transmitter a rotating directional transmitting antenna and an omnidirectional transmitting antenna, a motor for rotating said directional antenna, means for alternately connecting said antennas to said beacon transmitter, including switching means operated by cam operated switches driven from the antenna controlling motor, means for controlling the pulse duration and spacing of the generated pulses, including means for spacing said pulses according to a prearranged pattern peculiar to the particular transmitter involved and producing such a train of pulses for each interrogating pulse, means for receiving said interrogating pulses including an omnidirectional antenna, means for producing and radiating said interrogating pulses from a vehicle, means on said vehicle for receiving the coded pulses transmitted by the beacon transmitter, means for producing on a cathode ray tube a rotating radial sweep, means for causing said sweep to rotate at the same speed as the rotating antenna at the beacon station, means for indicating on said tube the time at which said rotating antenna is directed in a predetermined geographic direction, and means for modulating the beam intensity of said tube in accordance with the received pulses, whereby there is presented thereon a representation of the bearing of the vehicle relative to the beacon station.

6. A system for navigation by means of a pulse type radio beacon transmitter capable of being triggered by an interrogating pulse, wherein there are supplied in conjunction with said transmitter a rotating directional transmitting antenna and an omnidirectional transmitting antenna, means for alternately connecting said antennas to said beacon transmitter, means for controlling the pulse duration and spacing of the generated pulses, including means for spacing said pulses according to a prearranged pattern peculiar to the particular transmitter involved and producing such a train of pulses for each received interrogating pulse, means for receiving said interrogating pulses at said transmitting station including an omnidirectional antenna, means for producing and radiating from a vehicle said interrogating pulses, means on said vehicle for receiving the coded pulses transmitted by the beacon station, means for producing on a cathode ray tube a rotating radial sweep, means for causing said sweep to rotate at the same speed as the rotating antenna at the beacon station, means for indicating on said tube the time at which said rotating antenna is directed in a predetermined geographic direction, said means including the transmission from the beacon transmitter at said time, pulses coded in a manner different from the normal station identifying code otherwise transmitted, and means for modulating the beam of said cathode ray tube in accordance with the pulses received from the beacon transmitter, whereby there is presented thereon a representation of the bearing of the vehicle relative to the beacon station.

7. A system for navigation by means of a radio beacon transmitter capable of being triggered by an interrogating pulse, wherein there are supplied in conjunction with said transmitter a rotating directional transmitting antenna and an omnidirectional transmitting antenna, a sychronous motor for rotating said directional antenna, means for alternately connecting said antennas to said beacon transmitter, means for controlling the pulse duration and spacing of the generated pulses, including means for spacing said pulses according to a prearranged pattern peculiar to the particular transmitter involved and producing such a train of pulses for each received interrogating pulse, means for receiving said interrogating pulses at said transmitting station including an omnidirectional antenna, means for producing and radiating from a vehicle said interrogating pulses, means on said vehicle for receiving the coded pulses transmitted by the beacon station, means for producing on a cathode ray tube a rotating radial sweep, means for causing said sweep to rotate at the same speed as the rotating antenna at the beacon station, means for indicating on said tube the time at which said antenna is directed in a predetermined geographic direction, said means including the transmission from the beacon transmitter at said time pulses coded in a manner different from the normal station identifying code otherwise transmitted, means including switches cam operated from the antenna controlling synchronous motor for producing said change in coding, and means for modulating the beam of said cathode ray tube in accordance with the pulses received from said beacon transmitter, whereby there is presented thereon a representation of the bearing of the vehicle relative to the beacon station.

8. A system for navigation by means of a pulse type radio beacon transmitter capable of being triggered by an interrogating pulse, wherein there are supplied in conjunction with said transmitter a rotating directional transmitting antenna and an omnidirectional transmitting antenna, means for alternately connecting said antennas to said beacon transmitter, means for controlling the pulse duration and spacing of the generated pulses, including means for spacing said pulses according to a recognizable prearranged pattern peculiar to the particular transmitter involved and producing a train of such pulses for each received interrogating pulse, means for receiving said interrogating pulses at said transmitting station including an omnidirectional antenna, means for producing and radiating from a vehicle said interrogating pulses, said radiating means consisting of a single antenna omnidirectional in the horizontal plane, means on said vehicle for receiving the coded pulses transmitted by the beacon station, means for producing on a cathode ray tube a rotating radial sweep, means for causing said sweep to rotate at the same speed as the rotating antenna at the beacon station, means for indicating on said tube the time at which said antenna is directed in a predetermined geographic direction, and means for modulating the beam of said tube in accordance with the received pulses, whereby there is presented thereon a representation of the bearing of the vehicle relative to the beacon station.

9. A system for navigation by means of a pulse type radio beacon transmitter capable of being triggered by an interrogating pulse, wherein there is supplied in conjunction with said transmitter a rotating directional transmitting antenna, and an omnidirectional transmitting antenna, means for alternately connecting said antennas to said transmitter means for controlling the pulse duration and spacing of the generated pulses, including means for spacing said pulses according to a recognizable prearranged pattern peculiar to the particular transmitter involved and producing a train of such pulses for each receiving interrogating pulse, means for receiving said interrogating pulses at said transmitting station including an omnidirectional antenna, means for producing and radiating from a vehicle said interrogating pulses, means for radiating said interrogating pulses, consisting of a single antenna omnidirectional in the horizontal plane, means on said vehicle for receiving the coded pulses transmitted by the beacon station, means for producing on a cathode ray tube a rotating radial sweep, means for causing said sweep to rotate at the same speed as the rotating antenna at the beacon station, including synchronous motors, one of which controls the antenna rotation and the other of which controls the sweep rotation, means for causing said motors to rotate at the same speed, including frequency standards used as voltage supply means, means for indicating on said tube the time at which said antenna is directed in a predetermined geographic direction, and means for modulating the beam of said tube in accordance with the received pulses, whereby there is presented thereon a representation of the bearing of a vehicle relative to the beacon station.

10. A system for navigation comprising a beacon transmitter capable of being triggered by an interrogating pulse, an omnidirectional receiving antenna for said beacon transmitter, means connected to said antenna for receiving interrogating pulses, another omnidirectional and a rotating directional antenna for said beacon transmitter, means for alternately connecting said other omnidirectional antenna and said directional antenna to the beacon transmitter, coding means for determining the pattern of the transmitted pulses, means for rotating the directional antenna, means for causing a distinctive pulse to be emitted when the rotating antenna is directed in a predetermined geographic direction, means for emitting an interrogating pulse from a vehicle, means on said vehicle for receiving the coded and distinctive pulses transmitted from the beacon, a cathode ray tube on the vehicle, means for producing a rotating radial sweep on said tube which rotates at the same speed as the rotating antenna at the beacon, and means for modulating the beam of said cathode ray tube in accordance with the received pulses whereby there is presented thereon a representation of the bearing of the vehicle relative to the beacon.

11. A system for navigation comprising a beacon transmitter capable of being triggered by an interrogating pulse, a receiving means and omnidirectional antenna connected to said beacon, another omnidirectional antenna and a directional antenna, means for alternately connecting the last-mentioned antennas to the beacon transmitter, means for rotating the directional antenna, coding means for determining the pattern of the transmitted pulses, means for causing a distinctive pulse to be emitted when the rotating antenna is directed in a predetermined geographic direction, means for emitting an interrogating pulse from a vehicle, means on said vehicle for receiving the pulses emitted from the beacon, a cathode ray tube having a radial sweep, means for rotating the sweep at the same speed as the rotating antenna at the beacon and means for modulating the beam of the tube in accordance with the received pulses whereby there is presented thereon a representation of the bearing of the vehicle relative to the beacon.

HAROLD E. BRYAN.

REFERENCES CITED

The following references are of record in the file of this patent:

UNITED STATES PATENTS

| Number | Name | Date |
| --- | --- | --- |
| 833,034 | De Forest | Oct. 9, 1906 |
| 1,135,604 | Meissner | Apr. 13, 1915 |
| 2,134,716 | Gunn | Nov. 1, 1938 |
| 2,252,083 | Luck | Aug. 12, 1941 |
| 2,400,641 | Hardy | May 21, 1946 |
| 2,405,239 | Seeley | Aug. 6, 1946 |
| 2,408,848 | Hammond | Oct. 8, 1946 |
| 2,411,520 | Capen | Nov. 26, 1946 |
| 2,412,669 | Bedford | Dec. 17, 1946 |
| 2,433,381 | Marchand | Dec. 30, 1947 |
| 2,480,123 | Deloraine | Aug. 30, 1949 |
| 2,515,178 | Barchok | July 18, 1950 |

FOREIGN PATENTS

| Number | Country | Date |
| --- | --- | --- |
| 317,826 | Great Britain | May 29, 1930 |